(12) United States Patent
Hayes

(10) Patent No.: US 11,203,837 B2
(45) Date of Patent: Dec. 21, 2021

(54) RECYCLED OR BROWN PAPER BOARD AND METHODS OF MAKING SAME

(75) Inventor: Peter C. Hayes, Charlotte, NC (US)

(73) Assignee: BASF SE

( * ) Notice: Subject to any disclaimer, the term of this patent is extended or adjusted under 35 U.S.C. 154(b) by 771 days.

(21) Appl. No.: 13/996,908

(22) PCT Filed: Dec. 19, 2011

(86) PCT No.: PCT/EP2011/073179
§ 371 (c)(1),
(2), (4) Date: Sep. 17, 2013

(87) PCT Pub. No.: WO2012/084775
PCT Pub. Date: Jun. 28, 2012

(65) Prior Publication Data
US 2014/0004337 A1    Jan. 2, 2014

Related U.S. Application Data

(60) Provisional application No. 61/426,189, filed on Dec. 22, 2010.

(51) Int. Cl.
*D21H 17/00*   (2006.01)
*C09D 125/08*   (2006.01)
(Continued)

(52) U.S. Cl.
CPC .............. *D21H 3/00* (2013.01); *C09D 125/08* (2013.01); *D21C 5/02* (2013.01); *D21H 19/20* (2013.01);
(Continued)

(58) Field of Classification Search
None
See application file for complete search history.

(56) References Cited

U.S. PATENT DOCUMENTS

| 3,660,336 A | 5/1972 | Gonta et al. |
| 4,792,357 A | 12/1988 | Bier |

(Continued)

FOREIGN PATENT DOCUMENTS

| CA | 2202968 A1 | 10/1998 |
| WO | 2005/049920 | 6/2005 |

(Continued)

OTHER PUBLICATIONS

Rohm and Haas, Synthethic Plastic Pigment, Rohm and Haas Company, pp. 1-26, retrieved Feb. 20, 2017.*

(Continued)

*Primary Examiner* — Callie E Shosho
*Assistant Examiner* — John Vincent Lawler
(74) *Attorney, Agent, or Firm* — Faegre Drinker Biddle & Reath LLP

(57) ABSTRACT

Recycled or brown paper board is provided having a surface with a coating having one or more layers, at least one coating layer comprising one or more copolymers selected from the group consisting of styrene-acrylic-based copolymers, styrene-butadiene-based copolymers, and mixtures thereof, wherein the average Tg of the copolymers present in the coating layer is 25° C. or greater and the average polymer particle size of the copolymers present in the coating layer is 130 nm or greater. A method of producing a coated recycled paper board or brown paper board and a coating composition are also provided.

20 Claims, 5 Drawing Sheets

(51) Int. Cl.
    D21H 19/58    (2006.01)
    D21H 19/22    (2006.01)
    D21H 19/38    (2006.01)
    D21C 5/02     (2006.01)
    D21H 19/82    (2006.01)
    D21H 19/20    (2006.01)

(52) U.S. Cl.
    CPC .......... *D21H 19/22* (2013.01); *D21H 19/385* (2013.01); *D21H 19/58* (2013.01); *D21H 19/828* (2013.01); *Y02W 30/64* (2015.05); *Y10T 428/254* (2015.01)

(56) References Cited

U.S. PATENT DOCUMENTS

| | | | | |
|---|---|---|---|---|
| 5,302,244 | A * | 4/1994 | Nguyen | D21C 5/02 162/6 |
| 5,582,874 | A | 12/1996 | Hyde | |
| 5,837,762 | A * | 11/1998 | Stollmaier | C08J 5/24 524/274 |
| 6,117,563 | A * | 9/2000 | Watanabe | G03C 3/00 428/537.5 |
| 6,841,655 | B1 | 1/2005 | Gota et al. | |
| 7,745,011 | B2 | 6/2010 | Cantu-Gonzalez | |
| 2002/0136913 | A1 * | 9/2002 | Schaedler | D21H 27/10 428/512 |
| 2003/0188839 | A1 * | 10/2003 | Urscheler | D21H 19/82 162/123 |
| 2005/0089643 | A1 * | 4/2005 | Abundis | D21H 19/58 427/391 |
| 2005/0287385 | A1 | 12/2005 | Quick | |
| 2006/0060317 | A1 * | 3/2006 | Roding | D21H 19/82 162/135 |
| 2010/0151255 | A1 | 6/2010 | Williams et al. | |
| 2010/0181037 | A1 | 7/2010 | Esser et al. | |
| 2010/0186915 | A1 | 7/2010 | Esser et al. | |
| 2010/0190012 | A1 | 7/2010 | Branston et al. | |
| 2018/0245291 | A1 * | 8/2018 | Pang | D21J 1/08 |

FOREIGN PATENT DOCUMENTS

| | | | | |
|---|---|---|---|---|
| WO | 2009/064942 | | 5/2009 | |
| WO | WO 2009064942 | A1 * | 5/2009 | .......... C09D 123/02 |
| WO | 2010/058087 | | 5/2010 | |

OTHER PUBLICATIONS

Kolthoff—Mercaptans as promoters—copolymerization of butadiene-styrene—Part I—J. Poly.Sci. vol. 2—1947 (Year: 1947).*
Blackley1983_Chapter_ButadienePolymersAndCopolymers (Year: 1983).*
Lee—Latex applications in paper coating—Asua (ed)—Polym. Dispersions—Principles—1997 (Year: 1997).*
Vaclavek—Regulation of MW of styrene-butadiene—J.App.Poly.Sci.—1967 (Year: 1967).*
Guyot—High solid content latexes—Prog.Poly.Sci.—2002 (Year: 2002).*
Scientific Polymer Products—Density of Polymers (by density)—scipoly.com—Apr. 8, 2021 (Year: 2021).*
Adams, Anthony A., "Effect of Size Press Treatment on Coating Holdout," Hercules, Inc., Wilmington, DE, USA, TAPPI Journal (1983), 66(5), pp. 87-91 (Abstract).
Barber, Edwin et al., "Soluble Polymers in Air Knife Coating," Hercules, Inc., Wilmington, DE, USA, TAPPI (1976), 59(6), pp. 123-126 (Abstract).
Carlsson, Jonas et al., "A Comparison of Metering Elements for Producing Double-Coated Paperboard," BTG Eclepens, S.A., Eclepens, Switzerland, Coating and Graphic Arts Conference and Exhibit, Baltimore, MD, USA, May 16-19, 2004, Meeting Date 2004, pp. 48-57 (Abstract).
Climpson, N.A et al., "Pore Size Distributions and Optical Scattering Coefficients of Clay Structures," TAPPI, Jul. 1976, vol. 59, No. 7 pp. 89-92.
Etzel, Reinhard et al., "OptiSpray—The New Improved Coating Technology and the First Production Results," Albbruck, Germany, lpw (2004), (3), pp. 50-56. (Abstract).
Groves, R. et al., "Styrene-Butadiene Latex Binders and Coating Structure," TAPPI Coating Conference (1993) p. 187.
Hamalainen, Markku et al., "A New Coating Method for Surface Treatment of Wood-Containing Paper Grades," Stora Enso Corporation, Anjalankoski, Finland, Coating & Graphic Arts Conference and Trade Fair, Orlando, FL, USA, May 5-8, 2002, pp. 38-54 (Abstract).
Johns, Ronald E. et al., "Chemically Structured Kaolin: A New Coating Pigment," Engelhard Corp., Edison, NJ, USA, TAPPI Journal (1990), 73(2), pp. 77-84. (Abstract).
Knappich, R. et al., "Optimized Binder Systems for Natural Calcium Carbonate Pigments with Narrow Particle Size Distribution," Dow Europe S.A., Horgen, Switzerland, PTS-Symposium (1999), 901 (Vortragsband-19. PTS-Streicherel-Symposium, 1999), 13, 13E, 13E/1-13E/16 (Abstract).
Knappich, Rainer et al., "Wet and Dry Coating Structure of Calcium Carbonate Pigments with Narrow Particle Size Distribution," Paper Latex TS and D, Dow Europe, SA, Horgen, Switzerland, TAPPI Coating Conference, Proceedings, Toronto, May 2-5, 1999, pp. 373-386 (Abstract).
Knappich, Rainer et al., "Wet Dry Coating Structure of Calcium Carbonate Pigments with Narrow Particle Size Distribution," Dow Europe S.A., Horgen, Switzerland, TAPPI Journal (2000), 83(2), pp. 91-98 (Abstract).
Kuni, Stefan et al., "Jet Coating Technology for High Quality Board," Coaters and Reels, Metso Paper, Inc., Jarvenpaa, Finland, Coating & Graphic Arts Conference and Trade Fair, Orlando, FL, USA, May 5-8, 2002, pp. 400-411 (Abstract).
Leino, Milka et al., "A New Board Coating Method," Valmet Corporation, Jarvenpaa, Finland, Coating/Papermakers Conference, New Orleans, USA, May 4-6, 1998, 2, pp. 791-806 (Abstract).
Lepoutre, P. et al., "Optical Properties and Structure of Clay-Latex Coatings," TAPPI 60(11), p. 86 (1977).
Lepoutre, P., "The Role of Polymeric Binders in Paper Coatings," Trends in Polymer Science (TRIPS) vol. 3, No. 4, Apr. 1995 pp. 112-116.
Lepoutre, P., "The Structure of Paper Coatings: An Update," Progress in Organic Coatings, 17, Pulp & Paper Research Institute of Canada, 570 St. John's Boulevard, Pointe Claire, Quebec, H9R 3J9, Canada, (1989) pp. 89-106.
Putkisto, Kaisa et al., "Preparation of Coating Particles For Dry Surface Treatment of Paper—The Effects of Particle Aggregation on Coating Structure," Institute of Automation and Control/Paper Machine Automation, Tampere University of Technology, Tampere, Finland, Nordic Pulp & Paper Research Journal (2003), 18(2), pp. 226-239 (Abstract).
Rentzhog, Maria et al., Effect of Corona Treatment of PE-Coated Board on Water-Based Flexographic Print Resistance, Institute for Surface Chemistry, YKI, Stockholm, Sweden, Nordic Pulp & Paper Research Journal (2006), 21(2), pp. 202-210 (Abstract).
Sandrock, R. et al., "Optimization of Pure Carbonate Formulations for Board Top Coats," Cascades Arnsberg GmbH, Arnsberg, Germany, Wochenblat fuer Papierfabrikation (2001), 129(5), pp. 283-284 and pp. 286-287 (Abstract).
Stanger, K., "On-Machine Surface Treatment of Paper and Board with the Blade Coater," Jagenberg Papiertechnik GmbH, Neuss, Germany, Surface Application of Paper Chemicals (1997), pp. 9-20 (Abstract).
Triantafillopoulos, Nick et al., "Operational Issues in High-Speed Curtain Coating of Paper, Part 1: The Principles of Curtain Coating," RohmNova LLC, Akron, Oh, USA, TAPPI Journal (2004), 3(11), pp. 6-10 (Abstract).
Wantanabe, J. et al., "A Mechanism for the Consolidation of the Structure of Clay-Latex Coatings," Journal of Applied Polymer Science, vol. 27, (1982) pp. 4207-4219.

(56) References Cited

OTHER PUBLICATIONS

Willenbacher, N. et al., "New Laboratory Test to Characterize Immobilization and Dewatering of Paper Coating Colors," TAPPI Journal 82(8), 1999, pp. 167-174.
Zeiner, Larry J., "Narrow PCC Promises Brighter Board With Proper Converting Operations," Specialty Minerals Inc., Bethlehem, PA, USA, Pulp & Paper (2006), 80(11), Publisher: RISI, CODEN: PUPAA8, ISSN: 0033-4081, pp. 39-43 (Abstract).
International Search Report in related International Patent Application No. PCT/EP2011/071379 dated Mar. 30, 2012.
Written Opinion in related International Patent Application No. PCT/EP2011/071379 dated Mar. 30, 2012.
International Preliminary Report on Patentability in related International Patent Application No. PCT/EP2011/071379 dated Jun. 25, 2013.

* cited by examiner

RECYCLED OR BROWN PAPER BOARD AND METHODS OF MAKING SAME

TECHNICAL FIELD

This disclosure relates to recycled or brown paper board and methods of making same, and more particularly to coatings based on copolymer dispersions for use in recycled or brown paper board.

BACKGROUND

Emulsion binders based on vinyl acetate (e.g. EVA) or copolymers of vinyl acetate and butyl acrylate are known to provide desirable light scattering in coated paper board such as recycled or brown paper board. The light scattering in the paper board coating is provided by the combination of the binders, fillers such as mineral pigments, and air voids in the coating. The coatings also provide a surface that allows the recycled and brown board to be printed upon, which is common, for instance, in paper board used for packaging. Although the vinyl acetate-butyl acrylate copolymers and EVA copolymers can provide good coverage (opacity), a large amount of the binder has to be used to provide the necessary amount of print strength to result in good printing quality and to prevent "picking" from occurring.

Recycled and brown paper board coatings also generally include a significant amount of titanium dioxide as it increases the overall opacity in the paper coating. Unfortunately, titanium dioxide is expensive and thus there is a desire to reduce the amount of titanium dioxide used in paper board coatings.

SUMMARY

Recycled or brown paper board is provided having a surface with a coating having one or more layers, at least one layer of the coating comprising one or more copolymers selected from the group consisting of styrene-acrylic-based copolymers, styrene-butadiene-based copolymers, and mixtures thereof, wherein the average Tg of the one or more copolymers present in the coating layer is 25° C. or greater and the average polymer particle size of the one or more copolymers used in the coating layer is 130 nm or greater. In some embodiments, the coating comprises two or more layers. In some embodiments, the coating layer can be the layer of the coating that is furthest from said surface (the outermost layer). The one or more copolymers used in the coating layer can have an average polymer particle size of from 140 nm to 220 nm or from 150 nm to 200 nm.

In some embodiments, the coating layer comprises more than one copolymer selected from the group consisting of styrene-acrylic-based copolymers, styrene-butadiene-based copolymers, and mixtures thereof, e.g., at least one styrene-acrylic-based copolymer and at least one styrene-butadiene-based copolymer. In some embodiments, the coating can include a layer including a styrene-acrylic-based copolymer and a styrene-butadiene-based copolymer. In some embodiments, each of the coating layers includes one or more copolymers selected from the group consisting of styrene-acrylic-based copolymers, styrene-butadiene-based copolymers, and mixtures thereof, wherein the average Tg of the one or more copolymers present in the coating layers is 25° C. or greater and the average polymer particle size of the one or more copolymers used in the coating layers is 130 nm or greater. In some embodiments, the coating comprises at least one layer comprising a styrene-acrylic-based copolymer and at least one layer comprising a styrene-butadiene-based copolymer. For example, the coating can include a first layer adjacent the paper board comprising a styrene-butadiene-based copolymer and a second layer adjacent the first layer comprising a styrene-acrylic-based copolymer. Alternatively, the coating can include a first layer adjacent the paper board comprising a styrene-acrylic-based copolymer and a second layer adjacent the first layer comprising a styrene-acrylic-based copolymer. In some embodiments, the coating comprises at least one styrene-acrylic-based copolymer or styrene-butadiene-based latex copolymer having a Tg of 25° C. or greater and at least one styrene-acrylic-based copolymer or styrene-butadiene-based copolymer having a Tg less than 25° C. The coating can consist essentially of one or more copolymers selected from the group consisting of styrene-acrylic-based copolymers, styrene-butadiene-based copolymers, and mixtures thereof. At least one of the one or more copolymers selected from the group consisting of styrene-acrylic-based copolymers, styrene-butadiene-based copolymers, and mixtures thereof can be further derived from (meth)acrylonitrile.

The outermost coating layer for the recycled paper board or brown paper board can include less than 10% by weight titanium dioxide on a dry basis based on total amount of filler in the coating layer. In some embodiments, the overall solids content in the coating or a coating layer is greater than 30%. The uncoated recycled paper board or brown paper board can have a TAPPI brightness of from 20 to 50. In some embodiments, the board is a Kraft unbleached brown board. The coated recycled paper board or brown paper board can have Prufbau passes to fail of 5 or greater using the Prufbau test method.

Also provided is a method of producing a coated recycled paper board or brown paper board, comprising applying a coating in one or more layers to a surface of the recycled paper board or brown paper board, at least one layer of the coating comprising one or more copolymers selected from the group consisting of styrene-acrylic-based copolymers, styrene-butadiene-based copolymers, and mixtures thereof, wherein the average Tg of the one or more copolymers present in the coating layer is 25° C. or greater and the average polymer particle size of the one or more copolymers present in the coating layer is 130 nm or greater; and allowing the coating to dry onto the surface of the recycled paper board or brown paper board. In some embodiments, the applying step comprises applying the coating in two or more layers to the surface. For example, the applying step can include applying a first coating layer adjacent the paper board comprising one or more copolymers selected from the group consisting of styrene-acrylic-based copolymers, styrene-butadiene-based copolymers, and mixtures thereof and then applying a second coating layer adjacent the first coating layer comprising one or more copolymers including a styrene-acrylic-based copolymer, wherein the average Tg of the one or more copolymers present in the second coating layer is 25° C. or greater and the average polymer particle size of the one or more copolymers present in the second coating layer is 130 nm or greater. The average Tg of the one or more copolymers present in the first coating layer can also be 25° C. or greater and/or the average polymer particle size of the one or more copolymers present in the first coating layer can be 130 nm or greater. In some embodiments, the coating comprises more than one copolymer selected from the group consisting of styrene-acrylic-based copolymers, styrene-butadiene-based copolymers, and mixtures thereof, e.g., at least one styrene-acrylic-based copolymer and at least one styrene-butadiene-based copolymer. For example, the coating or a coating layer can include at least one styrene-acrylic-based copolymer or styrene-butadiene-based latex copolymer having a Tg of 25° C. or greater and at least one styrene-acrylic-based copolymer or styrene-butadiene-based copolymer having a Tg less than 25° C. In some embodiments, the copolymer in the coating consists essentially of one or more copolymers selected from the group consisting of styrene-acrylic-based copolymers, styrene-butadiene-based copolymers, and mixtures thereof. In some embodiments, the at least one copolymer selected from the group consisting of styrene-acrylic-based copolymers, styrene-butadiene-based copolymers, and mixtures thereof can be further derived from (meth)acrylonitrile.

A coating composition for recycled paper board or brown paper board is also disclosed comprising one or more copolymers selected from the group consisting of styrene-acrylic-based copolymers, styrene-butadiene-based copolymers, and mixtures thereof, wherein the average Tg of the one or more copolymers present in the coating composition is 25° C. or greater and the average polymer particle size of the one or more copolymers present in the coating composition is 130 nm or greater. In some embodiments, the average polymer particle size of the one or more copolymers is from 140 nm to 220 nm or from 150 nm to 200 nm. The coating composition can include more than one copolymer selected from the group consisting of styrene-acrylic-based copolymers, styrene-butadiene-based copolymers, and mixtures thereof. For example, the coating composition can include a styrene-acrylic-based copolymer or a styrene-butadiene-based latex copolymer having a Tg of 25° C. or greater and a styrene-acrylic-based copolymer or a styrene-butadiene-based copolymer having a Tg less than 25° C. In some embodiments, the one or more copolymers consist essentially of one or more copolymers selected from the group consisting of styrene-acrylic-based copolymers, styrene-butadiene-based copolymers, and mixtures thereof. At least one of the one or more copolymers selected from the group consisting of styrene-acrylic-based copolymers, styrene-butadiene-based copolymers, and mixtures thereof can be further derived from (meth)acrylonitrile. The coating for the recycled paper board or brown paper board can include less than 10% by weight titanium dioxide on a dry basis based on total amount of filler in the coating. In some embodiments, the overall solids content in the coating is greater than 30%.

The details of one or more embodiments are set forth in the description below. Other features, objects, and advantages will be apparent from the description and from the claims.

BRIEF DESCRIPTION OF DRAWINGS

FIG. 1 also shows the copolymers including an acid and a larger particle size of 190 nm were comparable to the POLYCO 3103 in brightness.

As shown in FIG. 2, the compositions based on copolymers or copolymer blends having a Tg of 25° C. or greater and an average particle size of 130 nm or greater produced superior brightness values.

As shown in FIGS. 4-5, the formulations for Examples 11-14 had a good balance of opacity (as shown by the contrast ratio) and coating strength (as shown by the Prufbau passes to fail).

DETAILED DESCRIPTION

Figure 1:
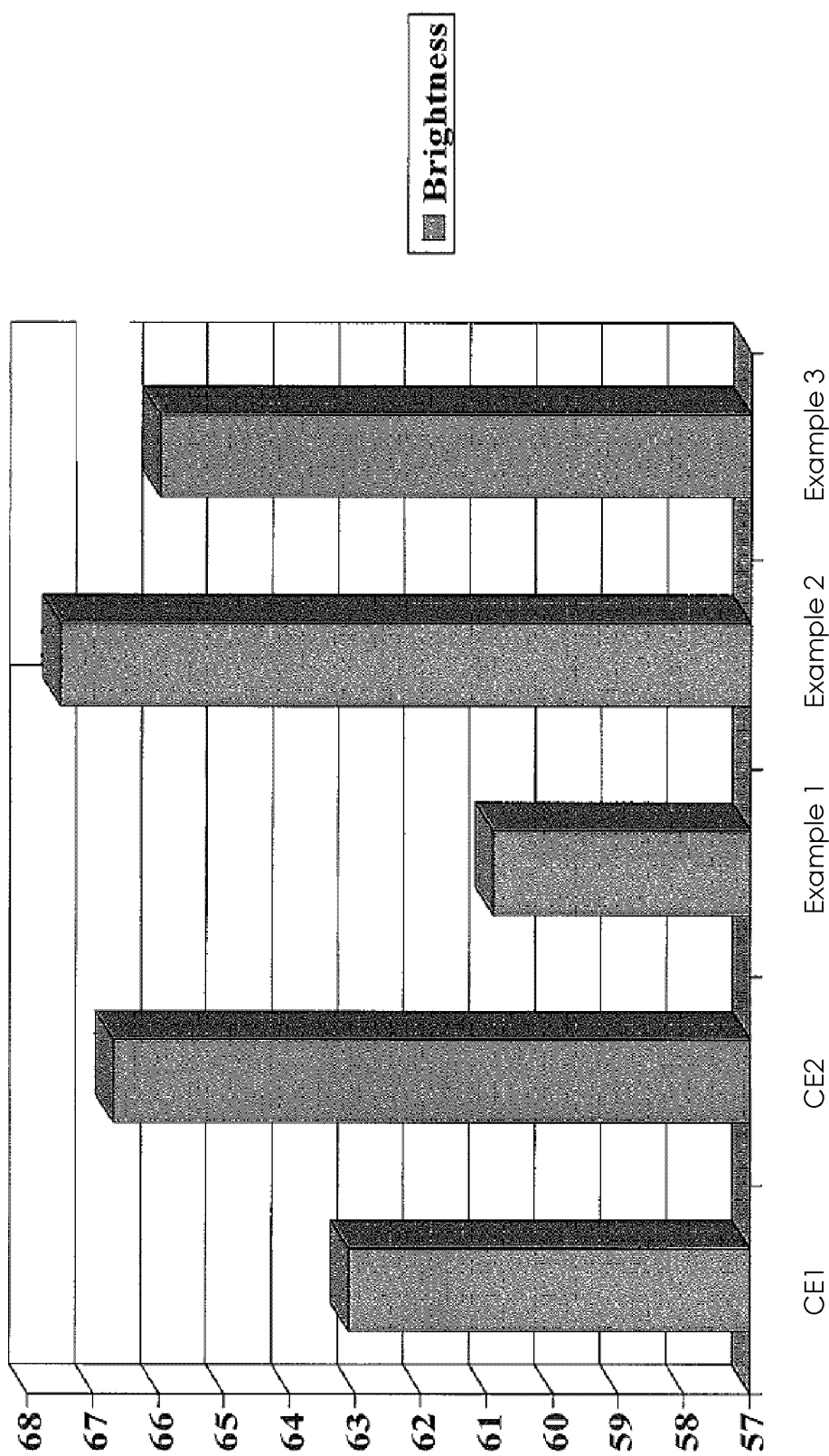
FIG. 1 provides the TAPPI brightness for the coated recycled paper board using each coating determined by taking the average of 15 different brightness measurements.

Recycled or brown paper board is provided having a surface with a coating having one or more layers, at least one layer of the coating comprising one or more copolymers selected from the group consisting of styrene-acrylic-based copolymers, styrene-butadiene-based copolymers, and mixtures thereof. The uncoated recycled paper board or brown paper board can have a TAPPI brightness of from 20 to 50 using TAPPI Test T452. In some embodiments, the recycled or brown board is unbleached, i.e., it has not undergone any bleaching process. In some embodiments, the board is a brown board such as a Kraft unbleached brown board.

At least one of the coating layers comprises one or more copolymers selected from the group consisting of styrene-acrylic-based copolymers, styrene-butadiene-based copolymers, and mixtures thereof. In some embodiments, the coating or a coating layer comprises more than one copolymer selected from the group consisting of styrene-acrylic-based copolymers, styrene-butadiene-based copolymers, and mixtures thereof. For example, the coating or a coating layer can include at least one styrene-acrylic-based copolymer and at least one styrene-butadiene-based copolymer, two styrene-butadiene-based copolymers, or two styrene-acrylic-based copolymers. Of the polymers present in the coating or a coating layer, there can be greater than 50%, greater than 60%, greater than 70%, greater than 80%, greater than 90%, or greater than 95% of the total polymer content that includes styrene-acrylic-based copolymers, styrene-butadiene-based copolymers, or mixtures thereof. In some embodiments, the polymers in the coating or a coating layer can consist essentially of or consist of styrene-acrylic-based copolymers, styrene-butadiene-based copolymers, or mixtures thereof.

In some embodiments, the coating comprises two or more layers (e.g., two or three layers) applied to the surface of the recycled paper board or brown paper board. The coating layers can be applied in an amount of from 5 to 25 g/m$^2$, from 7 to 20 g/m$^2$ or from 10 to 15 g/m$^2$ per layer. In some embodiments, the outermost layer includes one or more copolymers selected from the group consisting of styrene-acrylic-based copolymers, styrene-butadiene-based copolymers, and mixtures thereof. The one or more copolymers in the outermost layer can have an average Tg of 25° C. or greater and/or the average polymer particle size of the one or more copolymers can be 130 nm or greater. The layers can each include at least one styrene-acrylic-based copolymer, at least one styrene-butadiene-based copolymer, or a mixture thereof or a majority of the layers can include at least one styrene-acrylic-based copolymer, at least one styrene-butadiene-based copolymer, or a mixture thereof (e.g. two out of three layers). In some embodiments, the coating can comprise a first layer adjacent the paper board comprising one or more copolymers selected from the group consisting of styrene-acrylic-based copolymers, styrene-butadiene-based copolymers, and mixtures thereof, and a second layer adjacent the first layer comprising a styrene-acrylic-based copolymer. For example, the first layer can include at least one styrene-acrylic-based copolymer, at least one styrene-butadiene-based copolymer, or a blend of styrene-acrylic-based and styrene-butadiene-based copolymers. In some embodiments, the copolymers used in the first and second layers are the same or the coating compositions used in the first and second layers are the same.

The coating or a coating layer comprises one or more copolymers selected from the group consisting of styrene-acrylic-based and styrene-butadiene-based copolymers wherein the average glass transition temperature (Tg) of the copolymers present in the coating is 25° C. or greater. The average Tg is weighted based on the amount of the polymer included in the coating or coating layer. For example, if a coating layer includes 25% of a first copolymer having a Tg of 20° C. and 75% of a second copolymer having a Tg of 60° C., the average Tg would be (0.25)(20° C.)+(0.75)(60° C.) or 50° C. The average Tg can be greater than 25° C., 26° C. or greater, 27° C. or greater, 28° C. or greater, 29° C. or greater, or 30° C. or greater, or can be 60° C. or less, 55° C. or less, 50° C. or less, 45° C. or less, 40° C. or less, or 35° C. or less. In some embodiments, the coating or a coating layer comprises at least one styrene-acrylic-based copolymer or styrene-butadiene-based latex copolymer having a Tg of 25° C. or greater (e.g., from 25° C. to 100° C., 30° C. to 75° C. or 35° C. to 65° C.) and at least one styrene-acrylic-based copolymer or styrene-butadiene-based copolymer having a Tg less than 25° C. (e.g., from −5° C. to less than 25° C., 0° C. to 20° C. or 5° C. to 15° C.). In some embodiments, the coating can comprise a first layer adjacent the paper board comprising a styrene-acrylic-based copolymer or a styrene-butadiene-based copolymer having a Tg of 25° C. or greater and a second layer adjacent the first layer comprising a styrene-acrylic-based copolymer or a styrene-butadiene-based copolymer having a Tg of 25° C. or greater, or vice versa. The Tg can be measured using differential scanning calorimetry (DSC).

In some embodiments, the coating includes a styrene-acrylic-based copolymer having a Tg of 25° C. or greater. The styrene-acrylic-based copolymer can be derived from styrene and one or more (meth)acrylate monomers in an amount of 80% or greater, 85% or greater, 90% or greater, or 95% or greater, of the total monomer weight. As used herein, the term "(meth)acrylate" includes both acrylates and methacrylates. The (meth)acrylates can include esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{12}$, $C_1$-$C_8$, or $C_1$-$C_4$ alkanols such as ethyl, n-butyl, isobutyl and 2-ethylhexyl acrylates and methacrylates, dimethyl maleate and n-butyl maleate). Examples of (meth)acrylate monomers suitable for use in the styrene-acrylic-based copolymers include butyl acrylate, 2-ethylhexyl acrylate, ethyl acrylate, methyl methacrylate, and methyl acrylate. In some embodiments, the styrene-acrylic-based copolymer is derived from 60% or greater, 65% or greater, 70% or greater, 75% or greater, or 80% or greater styrene. The styrene-acrylic-based copolymer can be derived from the (meth)acrylate in an amount of 5%-30% or 10%-25%. In some embodiments, the (meth)acrylate includes butyl acrylate. The styrene-acrylic-based copolymer can further derived from (meth)acrylonitrile, for example, in an amount of greater than 0% to 30%, 3 to 25% or 5% to 20% (e.g. 15%). In some embodiments, the copolymer can be derived from acid-based monomers (e.g. α,β-monoethylenically unsaturated mono- and dicarboxylic acids such as acrylic acid, methacrylic acid, itaconic acid, crotonic acid, dimethacrylic acid, ethylacrylic acid, allylacetic acid, vinylacetic acid maleic acid, fumaric acid, mesaconic acid, methylenemalonic acid, and citraconic acid) in an amount of greater than 0% to 10% (e.g. 0.5% to 6% or 2% to 5%). In some embodiments, the copolymer includes itaconic acid and optionally acrylic acid. In some embodiments, the copolymer can be derived from (meth)acrylamide in an amount of greater than 0% to 5% (e.g. 0.5 to 3%). In some embodiments, the styrene-acrylic-based copolymer can include a small amount of butadiene, e.g., less than 5%. As would be understood to one skilled in the art, the coating could also include a styrene-acrylic-based copolymer having a Tg of less than 25° C.

In some embodiments, the coating includes a styrene-butadiene-based copolymer having a Tg of 25° C. or greater. The styrene-acrylic-based copolymer can be derived from styrene and butadiene in an amount of 80% or greater, 85% or greater, 90% or greater, or 95% or greater, of the total monomer weight. In some embodiments, the styrene-butadiene-based copolymer is derived from 60% or greater, 65% or greater, 70% or greater, 75% or greater, or 80% or greater styrene. The styrene-butadiene-based copolymer can be derived from 1,3-butadiene in an amount of 5%-35% or 10%-30%. The styrene-butadiene-based copolymer can further derived from (meth)acrylonitrile, for example, in an amount of greater than 0% to 25%, 2% to 20% or 5% to 15% (e.g. 10%). In some embodiments, the copolymer can be derived from acid-based monomers (e.g. α,β-monoethylenically unsaturated mono- and dicarboxylic acids such as acrylic acid, methacrylic acid, itaconic acid, crotonic acid, dimethacrylic acid, ethylacrylic acid, allylacetic acid, vinylacetic acid maleic acid, fumaric acid, mesaconic acid, methylenemalonic acid, and citraconic acid) in an amount of greater than 0% to 10% (e.g. 0.5% to 5%). In some embodiments, the copolymer includes itaconic acid and optionally acrylic acid. In some embodiments, the copolymer can be derived from (meth)acrylamide in an amount of greater than 0% to 5% (e.g. 0.5 to 3%). In some embodiments, the styrene-butadiene-based copolymer can include a small amount of a (meth)acrylate, e.g., less than 10% or less than 5%. As would be understood to one skilled in the art, the coating could also include a styrene-butadiene-based copolymer having a Tg of less than 25° C.

The styrene-acrylic-based copolymers and/or styrene-butadiene-based copolymers can further include additional monomers. Exemplary monomers include other vinylaromatic compounds (e.g., α-methylstyrene, o-chlorostyrene, and vinyltoluenes); 1,2-butadiene, isoprene; anhydrides of α,β-monoethylenically unsaturated mono- and dicarboxylic acids (e.g., maleic anhydride, itaconic anhydride, and methylmalonic anhydride); other alkyl-substituted acrylamides (e.g., N-tert-butylacrylamide and N-methyl(meth)acrylamide); vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl(meth)acrylate, hydroxypropyl(meth)acrylate, and methylpolyglycol acrylate); and monomers containing glycidyl groups (e.g., glycidyl methacrylate).

Additional monomers suitable for use in the copolymers include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzene-sulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl(meth)acrylates or alkylaminoalkyl(meth)acrylamides or quaternization products thereof (e.g., 2-(N,N-dimethylamino)ethyl(meth)acrylate, 3-(N,N-dimethylamino)propyl(meth)acrylate, 2-(N,N,N-trimethylammonium)ethyl(meth)acrylate chloride, 2-dimethylaminoethyl(meth)acrylamide, 3-dimethylaminopropyl(meth)acrylamide, and 3-trimethylammoniumpropyl (meth)acrylamide chloride); allyl esters of C1-C30 monocarboxylic acids; N-Vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl(meth)acrylate or diacetonacrylamide; monomers containing urea groups (e.g., ureidoethyl(meth)acrylate, acrylamidoglycolic acid, and methacrylamidoglycolate methyl ether); and monomers containing silyl groups (e.g., trimethoxysilylpropyl methacrylate).

Suitable monomers can also include one or more crosslinkers such as N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers can include diesters of dihydric alcohols with α,β-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In some embodiments, the crosslinking monomers can include alkylene glycol diacrylates and dimethacrylates, and/or divinylbenzene. The crosslinking monomers when used in the copolymer can be present in an amount of from 0.2 to 5 phm ("parts per hundred monomer") and are considered part of the total amount of monomers used in the copolymer.

Additional monomers can include copolymerizable surfactants present in the copolymer in an amount of from 0.5% to 5%, or 1% to 4% by weight. Suitable copolymerizable surfactants are described in U.S. Pat. No. 6,841,655, which is hereby incorporated by reference in its entirety. For example, ADEKA REASOAP SR-10, which includes ammonium salts of poly(oxy-1,2-ethanediyl),alpha-sulfo-omega-[1-(hydroxymethyl)-2-(2-propenyloxy)ethoxy]-, C11-rich, C10-14-branched alkyl ethers, can be used. Exemplary copolymerizable surfactants in which $R^1$ is C7-C11 alkyl-phenyl can include ADEKA REASOAP series NE and SE surfactants, such as NE-10, NE-20, NE-30, NE-40, NE-50, SE-10N, SE-20N, and SE-1025N.

In some embodiments, small amounts (e.g., from 0.01 to 4 phm) of molecular weight regulators, such as tert-dodecyl mercaptan, can be used. Such regulators can be added to the polymerization zone in a mixture with the monomers to be polymerized and are considered part of the total amount of monomers used in the copolymer.

The average polymer particle size of the copolymers present or used in the coating or a coating layer is 130 nm or greater. The average polymer particle size of the polymers in the coating or a coating layer can be determined by determining the average particle size of the polymer particles in the dispersions used in the coating and then determining the average based on the amount of each copolymer used in the coating. The average particle size can be measured using laser diffraction methods (e.g., by using a NICOMP instrument). For example, if the coating has two layers with one layer including 75% of the total amount of polymer in the coating and the average polymer particle size of the coating used in the first layer is 120 nm and the second layer includes 25% of the total amount of polymer in the coating and the average polymer particle size of the coating used in the second layer is 180 nm, the average polymer particle size for the copolymers present in the coating would be (0.75)(120 nm)+(0.25)(180 nm) or 135 nm. For a coating layer, the average particle size would just be determined by determining the average particle size of the polymers used in the coating composition for the coating layer. In some embodiments, the average polymer particle size of the copolymers present or used in the coating or a coating layer is 130 nm or greater, 135 nm or greater, 140 nm or greater, 145 nm or greater, 150 nm or greater, 155 nm or greater, or 160 nm or greater or 220 nm or less, 215 nm or less, 210 nm or less, 205 nm or less, or 200 nm or less. In some embodiments, the styrene-acrylic-based copolymer or styrene-butadiene-based copolymer in the coating or a coating layer, or all the styrene-acrylic-based copolymers or styrene-butadiene-based copolymers in the coating or a coating layer, have an average polymer particle size of 130 nm or greater (e.g., 135 nm or greater, 140 nm or greater, 145 nm or greater, 150 nm or greater, 155 nm or greater, or 160 nm or greater or 220 nm or less, 215 nm or less, 210 nm or less, 205 nm or less, or 200 nm or less).

The copolymer emulsion can be prepared by polymerizing the monomers using free-radical aqueous emulsion polymerization. The emulsion polymerization temperature is generally from 30 to 95° C. or from 75 to 90° C. In some embodiments, the polymerization medium is an aqueous medium. The emulsion polymerization can be carried out either as a batch, semi-batch or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethane-sulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfate and hydrogen peroxide can be replaced by tert-butyl hydroperoxide or alkali metal peroxydisulfates and/or ammonium peroxydisulfates. In general, the amount of free-radical initiator systems employed can be from 0.1 to 2 phm, based on the total amount of the monomers to be polymerized. In some embodiments, the initiators are ammonium and/or alkali metal peroxydisulfates (e.g., sodium peroxydisulfates), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In some embodiments, some of the initiator is introduced at the beginning and the remainder is added to the polymerization zone as it is consumed. It is also possible to carry out the free-radical aqueous emulsion polymerization under super-atmospheric or reduced pressure.

The copolymer can be produced as a dispersion that includes, as a disperse phase, particles of the copolymer dispersed in water. The copolymer dispersion can be prepared with a total solids content of from 10 to 75% by weight, 15 to 65% by weight, or 20 to 60% by weight. The copolymer dispersion can then be concentrated if desired to provide a total solids content of 40-75% by weight.

The polymer dispersions described herein can be combined with one or more fillers (e.g., mineral fillers and/or coating pigments) to produce a coating composition for recycled paper board or brown paper board. Mineral fillers generally have a substantial proportion of particles having a particle size greater than 2 microns whereas coating pigments have a substantial proportion of particles having a particle size less than 2 microns. In some embodiments, the mineral fillers and/or coating pigments can be added to impart certain properties to a paper such as smoothness, whiteness, increased density or weight, decreased porosity, increased opacity, flatness, glossiness, and the like. The mineral fillers and/or coating pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides (e.g. titanium dioxide), aluminum hydroxide, aluminum trihydrate, satine white, and magnesium oxide. The formulation can include exclusively mineral fillers or coating pigments but generally includes a blend of mineral fillers and coating pigments (e.g. weight ratios of 90:10, 80:20, 70:30, 60:40, 50:50, 40:60, 30:70, 20:80 or 10:90). Exemplary coating pigments include titanium dioxide coating pigments, MIRAGLOSS 91 (a kaolin clay coating pigment commercially available from BASF Corporation), LOPAQUE M (a kaolin clay coating pigment commercially available from Thiele Kaolin Company), and HYDROCARB 90 (a calcium carbonate coating pigment commercially available from Omya Paper). Titanium dioxide filler is often used with recycled paper board to provide increased coverage or opacity. In some embodiments, the filler content for the coating or a coating layer for the recycled paper board includes 90% clay (e.g. kaolin) and 10% titanium dioxide. In some embodiments, the coating or a coating layer (e.g. the outermost layer) for the recycled paper board or brown paper board can include less than 10%, less than 9%, less than 8%, less than 7%, less than 6%, less than 5%, less than 4%, less than 3%, less than 2%, less than 1%, or 0% by weight titanium dioxide based on the total amount of filler used in the coating. In some embodiments, wherein the coating has two or more layers, the coating can include coarse fillers (e.g. mineral fillers) in the first layer applied to the surface of the paper board (the basecoat) and fine fillers (e.g. coating pigments) in the second layer applied to the first layer (the topcoat).

In some embodiments, the coating composition can include one or more dyes and/or colored pigments to produce a colored or patterned paper or to change the shade of the paper. Exemplary dyes can include basic dyes, acid dyes, anionic direct dyes, and cationic direct dyes. Exemplary colored pigments include organic pigments and inorganic pigments in the form of anionic pigment dispersions and cationic pigment dispersions.

In some embodiments, one or more thickeners (rheology modifiers) can be added to increase the viscosity of the coating composition. Suitable thickeners can acrylic copolymer dispersions sold under the STEROCOLL and LATEKOLL trademarks from BASF Corporation, Florham Park, N.J., hydroxyethyl cellulose, guar gum, jaguar, carrageenan, xanthan, acetan, konjac, mannan, xyloglucan, urethanes and mixtures thereof. The thickeners can be added to the coating formulation as an aqueous dispersion or emulsion, or as a solid powder.

The coating composition described herein can include additives such as dispersants, initiators, stabilizers, chain transfer agents, buffering agents, salts, preservatives, fire retardants, wetting agents, protective colloids, biocides, corrosion inhibitors, crosslinkers, crosslinking promoters, and lubricants. Exemplary dispersants can include sodium polyacrylates in aqueous solution such as those sold under the DARVAN trademark by R.T. Vanderbilt Co., Norwalk, Conn.

The coating described herein or a coating layer can include greater than 30% solids by weight. For example, the coating or a coating layer can include greater than 35%, greater than 40%, greater than 45%, greater than 50%, greater than 55%, or greater than 60% solids, or less than 90%, less than 85%, less than 80%, less than 75%, or less than 70% solids by weight. In some embodiments, if the coating includes more than one layer, each layer of the coating can include greater than 30% solids.

The amount of filler in the coating or a coating layer can be from 60% to 95% by weight of the coating or a coating layer on a dry basis. For example, the coating or a coating layer can include can include 60% or greater, 65% or greater, or 70% or greater filler, and/or 95% or less 92.5% or less, or 90% or less filler by weight on a dry basis.

With regard to solid content of the coating or a coating layer, the copolymer can be present in an amount of 4 to 20 wt %, 6 to 18 wt %, or 8 to 16 wt % of the solid content of the coating. A thickener can be present in an amount of 0 to 5 wt %, greater than 0 to 3 wt %, or greater than 0 to 1 wt % of the solid content of the coating or a coating layer. Dyes and colored pigments can be present in an amount of 0 to 3 wt %, 0 to 2 wt %, or 0 to 1 wt % of the solid content of the coating or a coating layer. Other additives can be present in an amount of 0 to 5 wt %, 0 to 3 wt %, or 0 to 1 wt % of the solid content of the coating or a coating layer.

Also provided is a method of producing a coated recycled paper board or brown paper board, comprising applying a coating in one or more layers to a surface of the recycled paper board or brown paper board. The coating can be applied in one or more layers to the recycled paper board or brown paper board, for example, by using any known method such as an air knife, blade coating, roll coating, or a metered size press. The paper coating formulation can be provided on the paper board in an amount of 5-25 g/m² per layer. In some embodiments, the coating composition can be applied in an amount of less than 20% by weight or 5 to 15% by weight based on the weight of the coated paper board.

In some embodiments, the coated recycled paper board or brown paper board can have Prufbau passes to fail of 5 or greater, 6 or greater or 7 or greater.

In some embodiments, the coating composition described herein can have a water retention capacity (AAGWR at 2 ATMs for 2 minutes) of 100 g/m² or less, 90 g/m² or less, or 80 g/m² or less, when the formulation is applied to paper.

In some embodiments, the coating composition described herein can have an immobilization time of 100 sec or longer, 200 sec or longer, 300 sec or longer, 400 sec or longer, 500 sec or longer, or 600 sec or longer, as measured according to the method described in N. Willenbacher, et al., "New Laboratory Test to Characterize Immobilization and Dewatering of Paper Coating Colors" TAPPI Journal 82(8), 1999, pp 167-174.

The coatings described herein based on styrene-acrylic copolymers, styrene-butadiene copolymers, or mixtures thereof, provide a desirable amount of print strength without the need to provide as much of the copolymer in the coating as is typically used with vinyl acetate based copolymers used in the prior art. Thus, even when less of the copolymer is used than in typical with vinyl acetate based copolymers, the printing performance is improved. The coatings also provide good coverage/opacity to the recycled or brown paper board, even when less titanium dioxide is used compared to prior art coatings. The reduction in the amount of binder and titanium dioxide used in the coatings desirable reduces the cost of the coating.

Procedures

The Prufbau test method—Prufbau passes to fail measured according to the procedure below.
a. Prepare the sample (paper or paperboard) by allowing it to condition for 24 hours at 72° F.±5° F. and a relative humidity of 50%±5%.
b. Cut samples to measure approximately 240 mm+2 mm by 47+0.5 mm. If the sample is too wide, it may interfere with the run through the apparatus. If the sample is too narrow, it may result in the sample running off sideways, or askew.
c. Place the sample under clip located at the end of the sample carrier and fold sample back 180° so that it lies flat and parallel on the carrier with the side to be tested uppermost. Secure the free end with tape. Do not allow fingerprints to contaminate the portion of the sample to be tested.
d. The mounted sample is placed in the track before the printing station (multi-purpose print test machine-system Dr. Druner-Prufbau) and a 4 cm wide aluminum printing disc installed. The carrier should have the clip to the rear, so that the taped end of the sample is printed first.
e. Print the sample at a printing pressure of 800 N and a printing speed of 1 m/s. Use 0.3 ml ink per sample, a distribution time of 30 seconds, and a printing form inking time of 30 seconds.
f. With the same printing disc, after a 10 second pause, print again. Please note the length of the pause may be adjusted to achieve desired pick. Do not clean the disc between printings.
g. After another pause of the same duration, print the sample again. The sample is either printed a certain number of times or until it begins to pick, in which case the number of impressions is noted.
h. The number of impressions that are made when picking occurs is noted. If picking does not occur on the last impression, the symbol > and the number of the last impression is noted. Note: through progressive drying on both the paper and the printing disc, the ink becomes tackier. The paper is then subject to increasing force from print to print. The more closed the coating is against the fluid portion of the ink (i.e., the slower the rise in the ink's viscosity), the more passes are possible before picking begins.

EXAMPLES

The following non-limiting examples are provided to more fully illustrate some particular embodiments. Parts and percentages are provided on a per weight basis except as otherwise indicated.

Comparative Examples 1-2 and Examples 1-3

Coating formulations were prepared by combining the following ingredients:

| Ingredient | Activity % | Dry PPH[1] |
|---|---|---|
| Kaolin Clay[2] | 70.6 | 90.0 |
| Titanium Dioxide | 72.4 | 10.0 |
| Dispersant[3] | 40 | 0.20 |
| Copolymer Dispersion | 50 | 18.0 |
| Rheology Modifier[4] | 40 | 0.25 |
| Lubricant[5] | 50 | 0.80 |
| TOTAL | 66.3 | 119.3 |

[1]PPH = parts per hundred by weight of pigment
[2]LOPAQUE M pigment available from Thiele Kaolin Company
[3]DISPEX NV40 dispersant available from BASF Corporation
[4]STEROCOLL FS thickener available from BASF Corporation
[5]CALSAN 50 lubricant available from BASF Corporation The pH was adjusted to 8.5 for each formulation using NaOH and the total solids percent was adjusted to 60%. For Comparative Example 1, the copolymer was a styrene/butyl acrylate/acrylonitrile copolymer having a Tg of 6° C. and an average particle size of 200 nm. For Comparative Example 2, the copolymer was POLYCO 3103, a vinyl acetate/butyl acrylate copolymer commercially available from Rohm & Haas having a Tg of 29° C. and an average particle size of 242 nm. For Example 1, the copolymer was a styrene/butyl acrylate copolymer having a Tg of 25° C. and an average particle size of 130 nm. For Example 2, the copolymer was a styrene/butyl acrylate/itaconic acid/acrylic acid copolymer having a Tg of 25° C. and an average particle size of 190 nm. For Example 3, the copolymer was a styrene/butyl acrylate/itaconic acid copolymer having a Tg of 25° C. and an average particle size of 190 nm. The coatings were applied using a Modern Metalcraft Lab Coater ISO #PAT-W0705 in two layers to the recycled paper board, each at a coating weight of 12 g/m² (dry basis). The TAPPI brightness for the coated recycled paper board using each coating was determined by taking the average of 15 different brightness measurements and is provided in FIG. 1. As shown in FIG. 1, the copolymers including an acid and a larger particle size of 190 nm were comparable to the POLYCO 3103 in brightness.

Comparative Examples 3-4 and Examples 4-6

Figure 2:
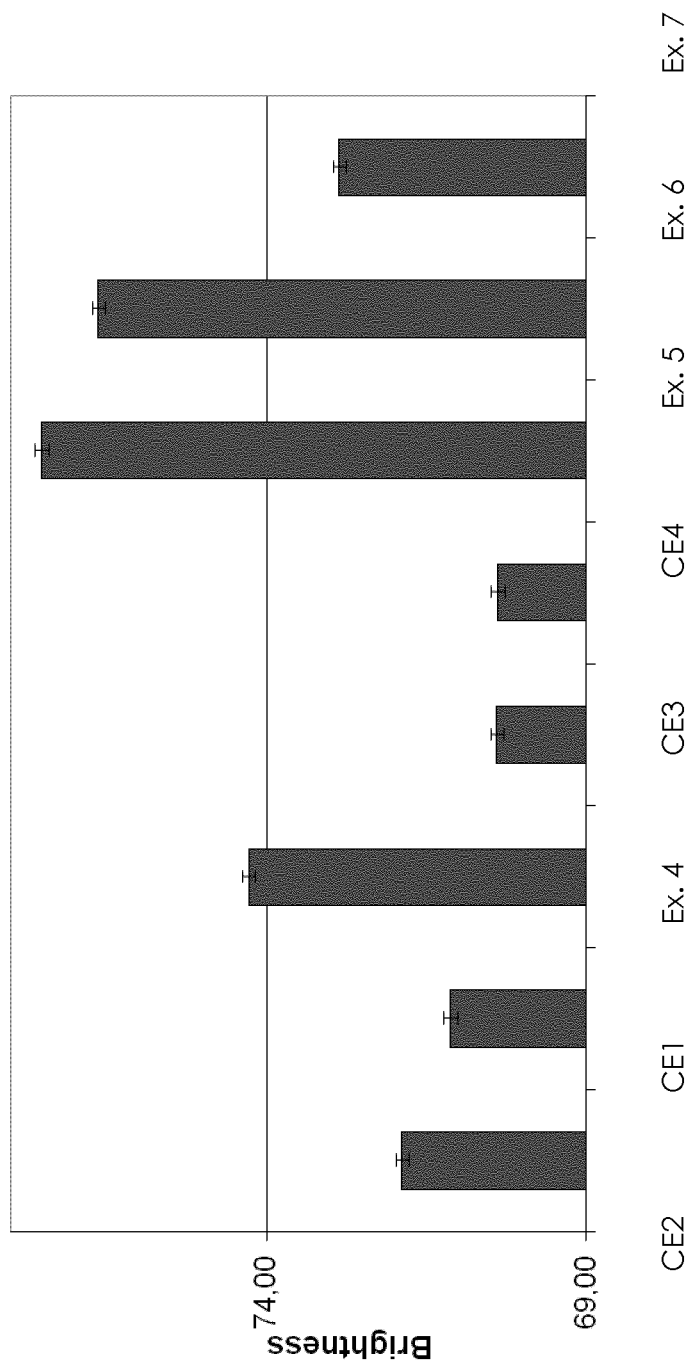
FIG. 2 provides the TAPPI brightness for the coated recycled paper board using each coating determined by taking the average of 15 different brightness measurements.

Additional coatings were prepared and applied to recycled paper board in the manner described above. Example 4 included a styrene/butyl acrylate/acrylonitrile copolymer having a Tg of 38° C. and an average particle size of 140 nm. Comparative Example 3 includes a styrene/butyl acrylate/acrylonitrile copolymer having a Tg of 6° C. and an average particle size of 130 nm. Comparative Example 4 includes a styrene/butyl acrylate copolymer having a Tg of −20° C. and an average particle size of 150 nm. Example 5 is a styrene/butadiene/itaconic acid/acrylic acid copolymer having a Tg of 65° C. and an average particle size of 200 nm. Example 6 is a blend of 70% of the copolymer of Example 5 and 30% of a styrene/butadiene/itaconic acid/acrylic acid copolymer having a Tg of 6° C. and an average particle size of 140 nm. Example 6 has an overall Tg of 47° C. and an overall particle size of 180 nm. Example 7 is a styrene/butyl acrylate copolymer having a Tg of 25° C. and an average particle size of 200 nm. The TAPPI brightness for the coated recycled paper board using each coating was determined by taking the average of 15 different brightness measurements and is provided in FIG. 2. As shown in FIG. 2, the compositions based on copolymers or copolymer blends having a Tg of 25° C. or greater and an average particle size of 130 nm or greater produced superior brightness values.

Examples 8-10

Figure 3:
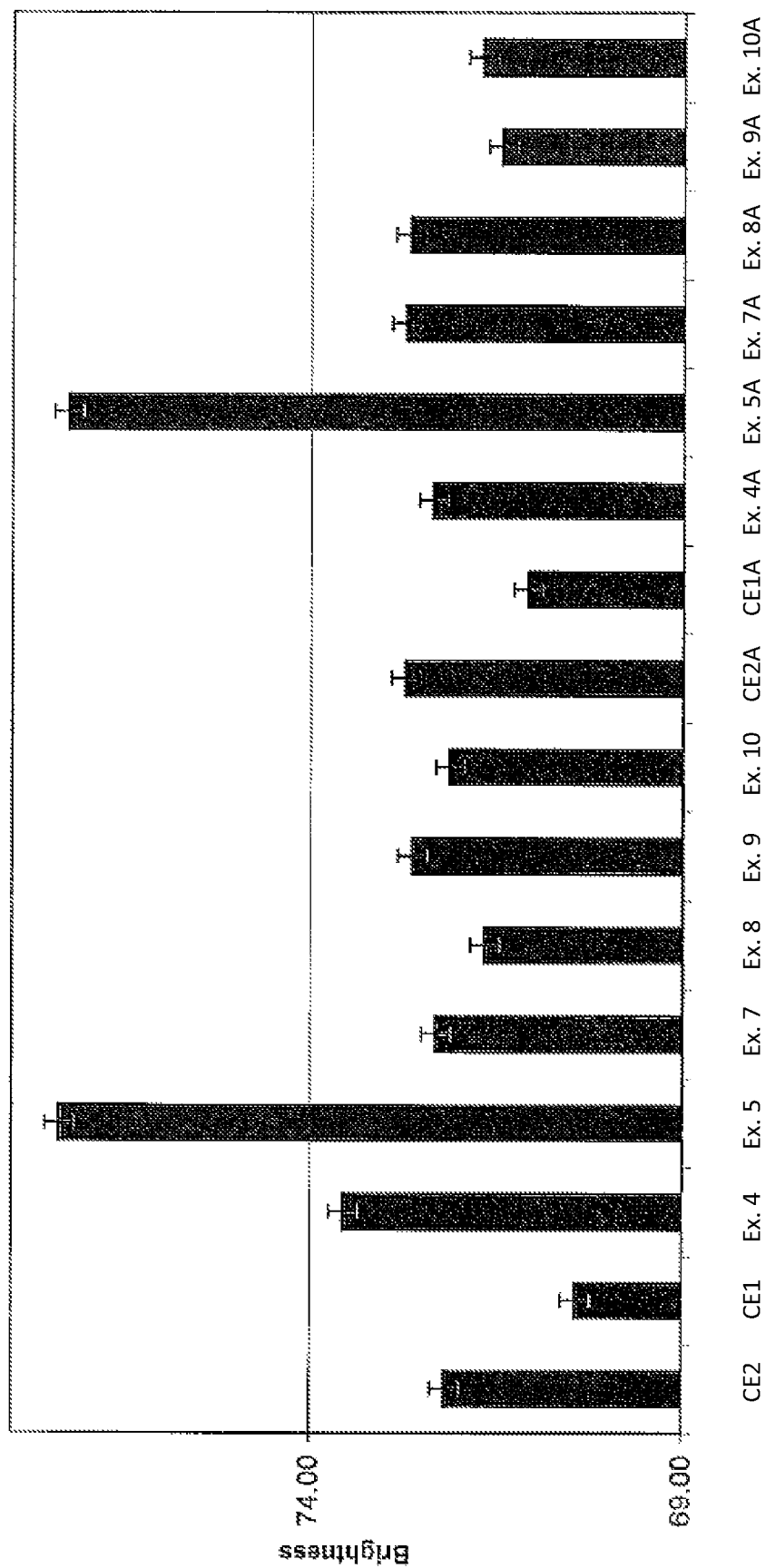
FIG. 3 provides the TAPPI brightness for the coated recycled paper board using each coating determined by taking the average of 15 different brightness measurements. Also shown in FIG. 3, the compositions based on copolymers or copolymer blends having a Tg of 25° C. or greater and an average particle size of 130 nm or greater produced good brightness values and these values were reproducible in subsequent tests.

Additional coatings were prepared and applied to recycled paper board in the manner described above. Example 8 is a blend of 25% of the copolymer of Comparative Example 1 and 75% of the copolymer of Example 4 having an overall Tg of 30° C. and an overall particle size of 155 nm. Example 9 is a blend of 50% of the copolymer of Comparative Example 1 and 50% of the copolymer of Example 4 having an overall Tg of 21° C. and an overall particle size of 170 nm. Example 10 is a blend of 75% of the copolymer of Comparative Example 1 and 25% of the copolymer of Example 4 having an overall Tg of 13° C. and an overall particle size of 185 nm. The TAPPI brightness for the coated recycled paper board using each coating was determined by taking the average of 15 different brightness measurements and is provided in FIG. 3. Each of the coatings were tested a second time to verify the reproducibility of the data and are designated with "A" after the example. As shown in FIG. 3, the compositions based on copolymers or copolymer blends having a Tg of 25° C. or greater and an average particle size of 130 nm or greater produced good brightness values and these values were reproducible in subsequent tests.

Examples 11-14

Figure 4:
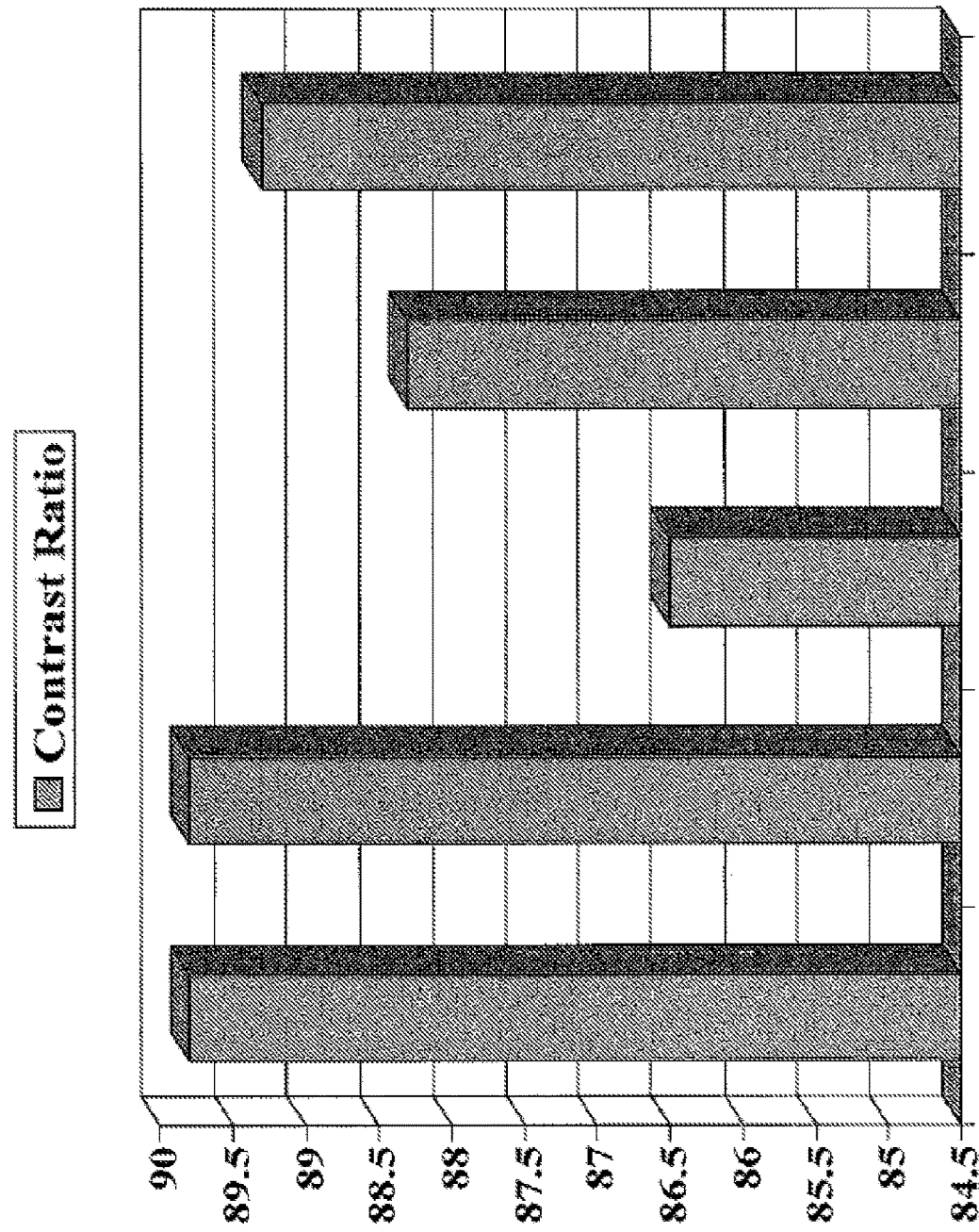
FIGS. 4 and 5 illustrate the number of Prufbau passes to fail for Comparative Example 2 and Examples 11-14.
Figure 5:
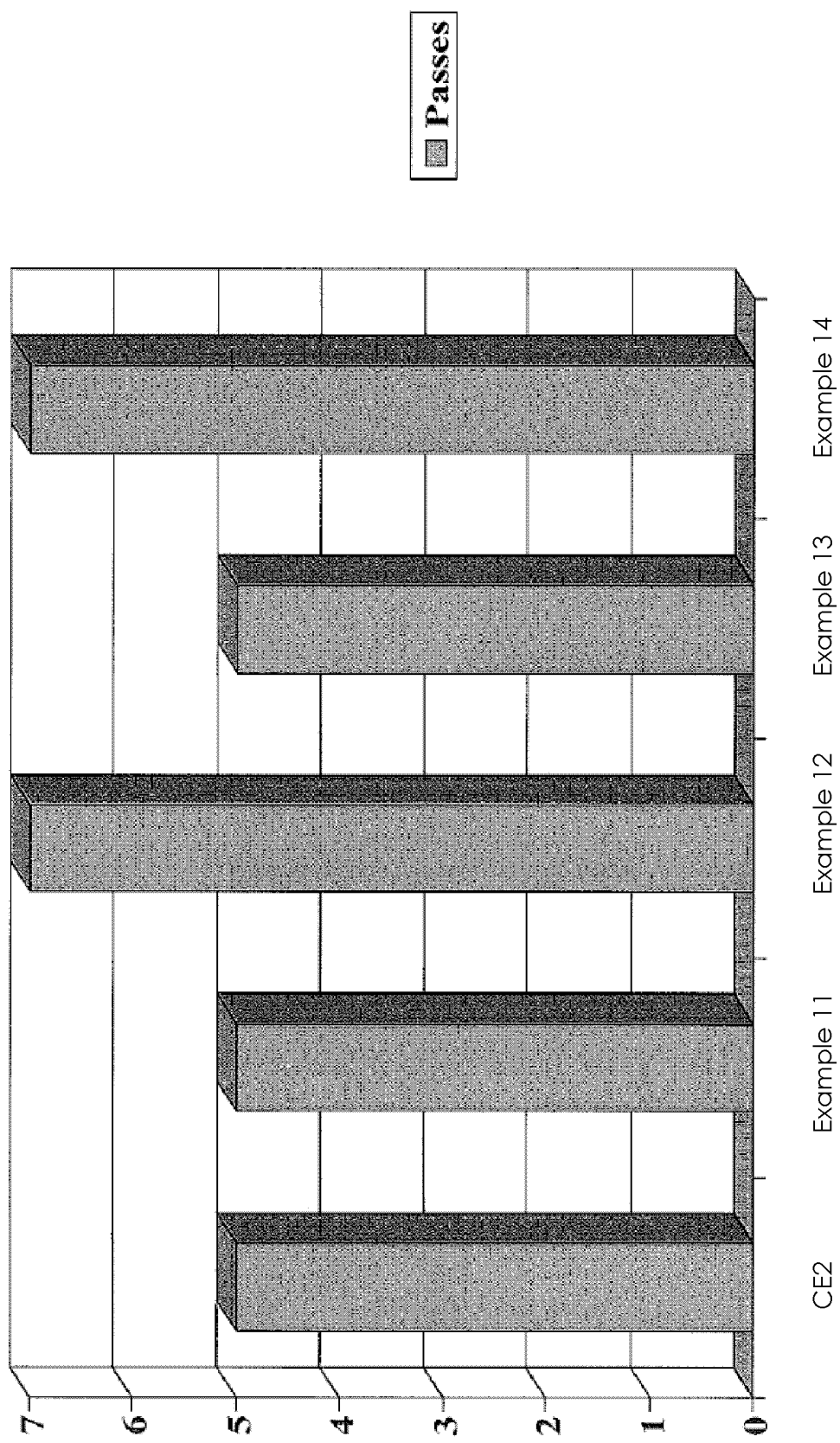

Additional coatings were prepared and applied to recycled paper board in the manner described above. In Example 11, the copolymer was a styrene/butyl acrylate copolymer having a Tg of 25° C. and an average particle size of 200 nm. In Example 12, the copolymer was a styrene/butyl acrylate copolymer having a Tg of 25° C. and an average particle size of 160 nm. In Example 13, the copolymer was a styrene/butyl acrylate copolymer prepared using 0.1 pph monomer of tert-dodecyl mercaptan molecular weight regulator, having a Tg of 25° C., and an average particle size of 200 nm. Example 14 is a blend of 25% of the copolymer of Comparative Example 1 and 75% of the copolymer of Example 4 having an overall Tg of 30° C. and an overall particle size of 155 nm. The contrast ratios for Comparative Example 2 and Examples 11-14 were measured using ASTM method D 6441-05 and are provided in FIG. 4. FIG. 5 illustrates the number of Prufbau passes to fail for Comparative Example 2 and Examples 11-14 using the procedure described herein. As shown in FIGS. 4-5, the formulations for Examples 11-14 had a good balance of opacity (as shown by the contrast ratio) and coating strength (as shown by the Prufbau passes to fail).

The compositions and methods described herein are not limited in scope by the embodiments disclosed herein which are intended as illustrations of a few aspects of the compositions and methods and any embodiments which are functionally equivalent are within the scope of the claims. Various modifications of the compositions and methods in addition to those shown and described herein will become apparent to those skilled in the art and are intended to fall within the scope of the appended claims. Further, while only certain representative combinations of monomers used to make a composition or method steps disclosed herein are specifically discussed in the embodiments above, other combinations of monomers used to make a composition or method steps will become apparent to those skilled in the art and also are intended to fall within the scope of the appended claims. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. Recycled paper board or brown paper board having a surface with a coating comprising a first layer adjacent the paper board and a second layer adjacent the first layer, wherein the first layer consists essentially of one or more copolymers and one or more mineral fillers and/or coating pigments, wherein the one or more mineral fillers and/or coating pigments consists of calcium carbonate, kaolin, clay, talc, diatomaceous earth, mica, barium sulfate, magnesium carbonate, vermiculite, graphite, carbon black, alumina, fumed silica, silica precipitated in powders or dispersions, colloidal silica, silica gel, titanium oxides, aluminum hydroxide, aluminum trihydrate, satine white or magnesium oxide, wherein the one or more copolymers are present in an amount greater than 95% by weight of the total polymer content of the first layer and consist of styrene-acrylic-based copolymers, styrene-butadiene-based copolymers, or mixtures thereof, wherein the average Tg of the one or more copolymers present in the first layer is from 25° C. to 75° C., wherein the average polymer particle size of the one or more copolymers used in the first layer is 130 nm or greater, and wherein the first layer has a coating weight of from 12 $g/m^2$ to 25 $g/m^2$, and wherein the one or more copolymers are prepared in the presence of a mercapto-containing molecular weight regulator present in an amount of from 0.01 to 4 parts by weight per hundred monomer.

2. The recycled paper board or brown paper board of claim 1, wherein the second layer includes one or more copolymers selected from the group consisting of styrene-acrylic-based copolymers, styrene-butadiene-based copolymers, and mixtures thereof, wherein the average Tg of the one or more copolymers present in the second layer is from 25° C. to 75° C. and the average polymer particle size of the one or more copolymers used in the second layer is 130 nm or greater.

3. The recycled paper board or brown paper board of claim 1, wherein the first layer consists essentially of more than one of the copolymers and/or the second layer comprises more than one copolymer selected from the group consisting of styrene-acrylic-based copolymers, styrene-butadiene-based copolymers, and mixtures thereof.

4. The recycled paper board or brown paper board of claim 1, wherein at least one of the one or more copolymers selected from the group consisting of styrene-acrylic-based copolymers, styrene-butadiene-based copolymers, and mixtures thereof is further derived from (meth)acrylonitrile.

5. The recycled paper board or brown paper board of claim 1, wherein the second layer comprises less than 10% by weight titanium dioxide based on total amount of filler in the coating on a dry basis.

6. The recycled paper board or brown paper board of claim 1, wherein the overall solids content of the coating is greater than 30% by weight.

7. The recycled paper board or brown paper board of claim 1, wherein the uncoated recycled paper board or brown paper board has a TAPPI brightness of from 20 to 50.

8. The recycled paper board or brown paper board of claim 1, wherein the average polymer particle size of the one or more copolymers used in the first layer is from 140 nm to 220 nm.

9. The recycled paper board or brown paper board of claim 1, wherein the one or more copolymers of the first layer consist of the styrene-butadiene-based copolymers and the second layer adjacent the first layer comprises a styrene-acrylic-based copolymer.

10. The recycled paper board or brown paper board of claim 1, wherein the one or more copolymers of the first layer consist of the styrene-acrylic-based copolymers and the second layer adjacent the first layer comprises a styrene-acrylic-based copolymer.

11. The recycled paper board or brown paper board of claim 1, wherein the mercapto-containing molecular weight regulator comprises tert-dodecyl mercaptan.

12. The recycled paper board or brown paper board of claim 1, wherein the copolymer is prepared as a dispersion and has a total solids content of from 10 to 75% by weight.

13. The recycled paper board or brown paper board of claim 1, wherein the one or more copolymers of the first layer consists of at least the styrene-butadiene-based copolymers and/or the second layer comprises a styrene-butadiene-based copolymer.

14. Recycled paper board or brown paper board having a surface with a coating comprising a first layer adjacent the paper board and a second layer adjacent the first layer, wherein the first layer comprises one or more copolymers, wherein the one or more copolymers are present in an amount greater than 95% by weight of the total polymer content of the first layer and consist of styrene-acrylic-based copolymers, styrene-butadiene-based copolymers, or mixtures thereof and wherein the average Tg of the one or more copolymers present in the first layer is 25° C. or greater, wherein the average polymer particle size of the one or more copolymers used in the first layer is from 130 nm to 220 nm, wherein the one or more copolymers are prepared in the presence of a mercapto-containing molecular weight regulator present in an amount of from 0.01 to 4 parts by weight per hundred monomer, wherein the copolymer is prepared as a dispersion and has a total solids content of from 10 to 75% by weight, and wherein the first layer has a coating weight of from 12 $g/m^2$ to 25 $g/m^2$ and wherein the first layer contains at least the styrene-butadiene-based copolymer and/or the second layer comprises a styrene-butadiene-based copolymer.

15. The recycled paper board or brown paper board of claim 14, wherein the mercapto-containing molecular weight regulator comprises tert-dodecyl mercaptan.

16. The recycled paper board or brown paper board of claim 14 wherein the first layer further comprises one or more mineral fillers or coating pigments which are selected from the group consisting of calcium carbonate, kaolin, clay, talc, diatomaceous earth, mica, barium sulfate, magnesium carbonate, vermiculite, graphite, carbon black, alumina, fumed silica, silica precipitated in powders or dispersions, colloidal silica, silica gel, titanium oxides, aluminum hydroxide, aluminum trihydrate, satine white, and magnesium oxide.

17. Recycled paper board or brown paper board having a surface with a coating comprising a first layer adjacent the paper board and a second layer adjacent the first layer, wherein the first layer consists essentially of one or more copolymers and one or more mineral fillers and/or coating pigments wherein the one or more mineral fillers and/or coating pigments fillers and/or coating pigments which are selected from the group consisting of calcium carbonate, kaolin, clay, talc, diatomaceous earth, mica, barium sulfate, magnesium carbonate, vermiculite, graphite, carbon black, alumina, fumed silica, silica precipitated in powders or dispersions, colloidal silica, silica gel, titanium oxides, aluminum hydroxide, aluminum trihydrate, satine white, and magnesium oxide, wherein one of the copolymer is present in an amount greater than 80% by weight of the total polymer content of the first layer and have a Tg of 25° C. or greater, wherein the average polymer particle size of the one or more copolymers used in the coating layer is from 130 nm to 220 nm, wherein the one or more copolymers present in the first layer comprise styrene-acrylic-based copolymers, styrene-butadiene-based copolymers, or mixtures thereof, wherein the one or more copolymers are prepared in the presence of a mercapto-containing molecular weight regulator present in an amount of from 0.01 to 4 parts by weight per hundred monomer, wherein the copolymer is prepared as a dispersion and has a total solids content of from 10 to 75% by weight, and wherein the first layer contains at least the styrene-butadiene-based copolymer and/or the second layer comprises a styrene-butadiene-based copolymer.

18. The recycled paper board or brown paper board of claim 17, wherein the one or more copolymers are present in an amount greater than 90% by weight of the total polymer content of the first layer.

19. The recycled paper board or brown paper board of claim 17, wherein the mercapto-containing molecular weight regulator comprises tert-dodecyl mercaptan.

20. The recycled paper board or brown paper board of claim 17, wherein the one or more copolymers of the first layer consists of at least the styrene-butadiene-based copolymers.

* * * * *